(12) United States Patent
Consonni et al.

(10) Patent No.: US 9,151,919 B2
(45) Date of Patent: Oct. 6, 2015

(54) FIRE RESISTANT OPTICAL CABLE

(75) Inventors: Enrico Consonni, Milan (IT); Luigi Caimi, Milan (IT); Davide Ceschiat, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 13/821,770

(22) PCT Filed: Sep. 10, 2010

(86) PCT No.: PCT/IB2010/002289
§ 371 (c)(1),
(2), (4) Date: Mar. 8, 2013

(87) PCT Pub. No.: WO2012/032370
PCT Pub. Date: Mar. 15, 2012

(65) Prior Publication Data
US 2013/0170800 A1    Jul. 4, 2013

(51) Int. Cl.
*G02B 6/44* (2006.01)
*H01B 7/295* (2006.01)

(52) U.S. Cl.
CPC .............. *G02B 6/4436* (2013.01); *G02B 6/443* (2013.01); *G02B 6/4433* (2013.01); *H01B 7/295* (2013.01)

(58) Field of Classification Search
None
See application file for complete search history.

(56) References Cited

U.S. PATENT DOCUMENTS

| | | | | |
|---|---|---|---|---|
| 3,576,940 A | * | 5/1971 | Stone et al. | 174/113 R |
| 3,935,018 A | * | 1/1976 | Ray et al. | 501/46 |
| 4,079,022 A | * | 3/1978 | Ferrarini et al. | 521/103 |
| 4,543,281 A | * | 9/1985 | Pedersen et al. | 138/148 |
| 4,942,903 A | * | 7/1990 | Jacobsen | 138/110 |
| 5,173,960 A | | 12/1992 | Dickinson | |
| 2003/0178220 A1 | * | 9/2003 | Barusseau et al. | 174/110 PM |
| 2005/0205290 A1 | * | 9/2005 | Pinacci et al. | 174/121 A |
| 2006/0155039 A1 | * | 7/2006 | Alexander et al. | 524/449 |
| 2011/0097047 A1 | * | 4/2011 | Fruhnert | 385/100 |

FOREIGN PATENT DOCUMENTS

| | | |
|---|---|---|
| DE | 195 17 392 A1 | 11/1996 |
| DE | 197 28 195 A1 | 1/1999 |

(Continued)

OTHER PUBLICATIONS

S. Stueflotten et al. Development and Testing of a Fire-Resistant Optical Cable. Journal of Lightwave Technology, LT-4:8:1173-1177, Aug. 1986.*

(Continued)

*Primary Examiner* — Mike Stahl
(74) *Attorney, Agent, or Firm* — Finnegan, Henderson, Farabow, Garrett & Dunner, L.L.P.

(57) ABSTRACT

A fire resistant optical cable includes: a plurality of optical fibers; at least one tubular layer of a ceramifiable material surrounding the plurality of optical fibers; and at least one flame shielding layer surrounding the tubular layer. The tubular layer of the ceramifiable material is able to mechanically protect the optical fibers not only during heating but also when the fire is extinguished, since it forms a sufficiently robust layer to withstand the mechanical stresses caused by the collapsing of the materials still surrounding the cable, especially in the transition portions between hot and cold zones. The tubular layer of the ceramifiable material is protected by means of at least one flame shielding layer which prevents the flames from directly acting on the ceramifiable material.

13 Claims, 4 Drawing Sheets

(56) References Cited

FOREIGN PATENT DOCUMENTS

| DE | 20 2004 011 064 U1 | | 12/2005 |
|----|----|----|----|
| EP | 0 107 796 A1 | | 5/1984 |
| EP | 60-79311 | | 5/1985 |
| EP | 0 272 516 A2 | | 6/1988 |
| GB | 2138168 A | * | 10/1984 |
| JP | 4-162007 A | * | 6/1992 |
| JP | 5-60956 A | * | 3/1993 |
| JP | 2001-35267 A | * | 2/2001 |
| WO | WO 00/058768 A1 | | 10/2000 |
| WO | WO 2005/022230 A1 | | 3/2005 |
| WO | WO 2010/012932 A1 | | 2/2010 |

OTHER PUBLICATIONS

International Standard IEC 60331-25, "Test for electric cables under fire conditions—Circuit Integrity, Part 25: Procedures and requirements—Optical fibre cables," (1999, $1^{st}$ Edition) pp. 3, 5, 7, 9, 11 and 13.

Internatinal Search Report from the European Patent Office for International Application No. PCT/IB2010/002289, mailing dated Jun. 16, 2011.

Written Opinion of the International Searching Authority from the European Patent Office for International Application No. PCT/IB2010/002289, mailing date Jun. 16, 2011.

* cited by examiner

FIRE RESISTANT OPTICAL CABLE

CROSS REFERENCE TO RELATED APPLICATION

This application is a national phase application based on PCT/IB2010/002289, filed Sep. 10, 2010, the content of which is incorporated herein by reference.

BACKGROUND OF THE INVENTION

The present invention relates to a fire resistant optical cable. More particularly, the present invention relates to a fire resistant optical cable which is able to resist to fire and to maintain its optical transmissive properties during and after the fire occurrence for a predetermined period of time.

Optical cables are generally used for medium or long distance telecommunications. There are specific applications where optical cables must have some ability to withstand fire aggression without significantly decreasing their transmission performance. For instance, cables used in fire alarm systems and/or local video surveillance must be able to continue to transmit data/signals in the presence of fire. The functionality of the optical cable must be maintained during the fire occurrence and usually also for a predetermined period of time after the fire is extinguished. Such kind of optical cables are usually installed in galleries and in buildings.

U.S. Pat. No. 5,173,960 discloses a fire retardant communication cable including a core which comprises at least one transmission media and fire retardant means which includes a material comprising a mixture of a first inorganic oxide constituent and a second inorganic oxide constituent. The first inorganic oxide constituent is characterized by melting when exposed to temperatures as low as about 350° C., whereas the second inorganic oxide constituent begins to crystallize at about 650° C. The fire retardant means is effective when said cable is exposed to temperatures in the range of about 350° C., to 1000° C., to form a crusty layer which insulates said core from heat energy and minimizes release of smoke and combustible gases. The fire-retardant means may be included as a jacket of the cable or as a longitudinally extending tape. Preferably, the fire retardant means is coextruded with the jacket. The transmission media may include one or more pairs of insulated metallic conductors or optical fibers.

International patent application WO 2010/012932 relates to a power and/or telecommunication cable comprising at least one conductive element surrounded by at least one insulating layer extending along the cable, the insulating layer being obtained from a composition containing the following compounds: a) an organic polymer, b) an inorganic compound containing a potassium oxide and/or one of the precursors thereof; c) a boron oxide and/or one of the precursors thereof; and d) calcium oxide CaO and/or one of the precursors thereof. The amount of the compound d) is at least 10 wt % of the total weight of the compounds b, c, and d in the composition. The above combination of inorganic fillers is able to react upon exposure to fire to produce a ceramic refractory material, which allows to maintain mechanical and electrical integrity of the cable during tire.

SUMMARY OF THE INVENTION

Initially, the Applicant has noticed that fire resistant optical cables available in the art, although working in many circumstances, require complex and specific constructions including several layers of different materials, which increase not only the manufacturing costs but also the dimensions of the final cable. Moreover, the necessity of particular core designs makes more difficult to achieve cables with a high fiber density, i.e. a high number of optical fibers per cable section unit.

Moreover, the Applicant has found out that the conventional fire resistant protections are in many circumstances not able to substantially minimize attenuation increase of the optical signal during exposure of the cable to fire, and are also scarcely effective when the fire is extinguished and therefore the cable is no longer heated.

According to the Applicant's experience, the most critical parts where the optical fibers can have attenuation increase and/or irreversible mechanical damages are the transition zones between the cable portions directly subjected to flame action ("hot zones") and the cable portions which are not burned ("cold zones"). During the fire aggression, the materials in the transition zones that are not completely melted can stress the fibers giving attenuation increase. When the fire is extinguished, during the cooling stage, in the transition zones between hot and cold zones the materials still surrounding the optical cable core cool down and thus shrink, while becoming tougher (modulus increase). Therefore, the above materials can collapse onto the optical fibers, which, being to a large extent devoid of their polymeric coatings (since (hiring fire they has been mainly burned off), are extremely sensitive to any mechanical stress, which is likely to cause macro- and micro-bending, and thus signal attenuation, and even breakage of the fibers themselves due to local peak loads.

Therefore, the Applicant has faced the problem of providing fire resistant optical cables having a high fiber density, which have suitable flexibility to be easily installed and which are able to maintain its optical transmission capability by showing reduced signal attenuation during and also after the fire occurrence for a predetermined period of time.

The Applicant has observed that a tubular layer of a ceramifiable material placed around the optical fibers may protect the fibers, but, when directly exposed to the flame action, it is prone to burn or to collapse before completing the chemical-physical transformation into a ceramic material, thereby leaving the fibers bare to the flame.

Consequently, the Applicant has found that an optical cable can effectively retain its transmission capability during fire occurrence and afterwards when the optical fibers are provided with a tubular layer of a ceramifiable material and when the flame action over such tubular layer is delayed for a time sufficient to allow the ceramifiable material to complete ceramization without collapsing onto the optical fibers.

Therefore, the Applicant has found that optical cables which are able to maintain their transmission capability, with reduced signal attenuation, not only when they are exposed to fire but also during the stages subsequent to fire extinguishing, can be obtained by surrounding the optical fibers with a tubular layer of a ceramifiable material which is in turn protected by at least one flame shielding layer.

In the optical cable according to the present invention, the tubular layer of the ceramifiable material is able to mechanically protect the optical fibers not only during heating but also when the fire is extinguished, since it forms a sufficiently robust layer to withstand the mechanical stresses caused by the collapsing of the materials still surrounding the cable, especially in the transitions portions between hot and cold zones. The above results can be achieved by protecting, during fire, the tubular layer of the ceramifiable material by means of at least one flame shielding layer which prevents the flames to directly act onto the ceramifiable material. In fact, the Applicant has found that a direct action of the flames onto the ceramifiable material may cause a quick collapse of the tubular structure onto the optical fibers.

In a first aspect the present invention relates to a fire resistant optical cable comprising:
  a plurality of optical fibers;
  at least one tubular layer of a ceramifiable material surrounding the plurality of optical fibers;
  at least one flame shielding layer surrounding the tubular layer.

In accordance with the present invention, with "ceramifiable material" it is intended an extrudable composition which, when exposed to an intense heating, e.g. caused by fire, at least partially burns and forms a coherent ceramic material which has a mechanical strength suitable to substantially retain its structural integrity, i.e. the original dimensions obtained after extrusion.

In accordance with the present invention, with "flame shielding layer" it is intended a layer made from a material which is able to withstand the flame action without burning or collapsing for a sufficient time to allow an underlaying layer of a ceramifiable material to complete its ceramization.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

According to a preferred embodiment, the fire resistant optical cable according to the present invention may further comprise at least one flame retardant sheath.

According to a preferred embodiment, in the fire resistant optical cable according to the present invention the plurality of optical fibers are arranged in micromodules.

According to a preferred embodiment, the ceramifiable material which can be used to produce the tabular layer comprises:
  at least one polymeric material;
  at least one glass frit;
  at least one inert inorganic filler.

Preferably, the polymeric material is selected from: polyolefins (homopolymers and copolymers); copolymers of ethylene with at least one ethylenically unsaturated ester; polyesters; polyethers; polyether/polyester copolymers; silicones; and mixtures thereof.

Preferably, the polyolefins may be selected from: polyethylene homopolymers; copolymers of ethylene with at least one alpha-olefin; polypropylene homopolymers; copolymers of propylene with ethylene and/or at least one alpha-olefin different from propylene. Particularly preferred are:
  high density polyethylene (HDPE) having a density of at least 0.940 g/cm$^3$, preferably of from 0.940 to 0.960 g/cm$^3$; medium density polyethylene (MDPE) having a density of from 0.926 to 0.940 g/cm$^3$; low density polyethylene (LDPE) and linear low density polyethylene (LLDPE) having a density of from 0.910 to 0.926 g/cm$^3$;
  copolymers of ethylene with at least one $C_3$-$C_{12}$ alpha-olefin, having a density of from 0.860 to 0.904 g/cm$^3$ and a Molecular Weight Distribution Index (MWDI) not higher than 5;
  elastomeric copolymers of ethylene with at least one alpha-olefin, such as ethylene/propylene copolymers (EPR) and ethylene/propylene/diene terpolymers (EPDM);
  thermoplastic propylene homopolymers or copolymers of propylene with ethylene and/or at least one alpha-olefin different from propylene, with an overall content of ethylene and/or at least one alpha-olefin different from propylene not higher than 10% by mole;
  heterophasic propylene copolymers obtained by sequential polymerization of propylene and of mixture of propylene with ethylene and/or at least one alpha-olefin, containing at least 70% by weight of propylene homopolymer or of crystalline propylene/ethylene copolymer, the remainder consisting of an elastomeric ethylene/propylene copolymer with a propylene content of from 30 to 70% by weight;

With "alpha-olefin" it is meant an olefin of $CH_2$=CH—R, wherein R is a linear or branched alkyl having from 1 to 10 carbon atoms. Preferably the alpha-olefin is a $C_3$-$C_8$ alpha-olefin. The alpha-olefin can be selected, for example, from: propylene, 1-butene, 1-pentene, 4-methyl-1-pentene, 1-hexene, 1-octene, 1-dodecene and the like.

As to the copolymers of ethylene with at least one ethylenically unsaturated ester, they are preferably selected from: ethylene/vinylacetate copolymers (EVA), ethylene/ethylacrylate copolymers (EEA), ethylene/butylacetate copolymers (EBA).

The polymeric material is preferably present in the ceramifiable material in an amount of from 10 to 60% by weight, more preferably from 15 to 40% by weight, with respect to the total weight of the material.

As to the glass frit, it is generally a mixture of glass-forming inorganic oxides, having a wide range of chemical composition so as to progressively melt over a wide range of temperature, usually some hundred degrees Celsius.

Examples of glass-forming inorganic oxides are:
  (i) phosphates glasses having the following mole percent composition: 1.2% to 3.5% of $B_2O_3$, 50% to 75% of $P_2O_5$, 0% to 30% of PbO and 0% to 5% of at least one oxide selected from the oxide of Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, Th, and U, which glass includes at least one oxide selected from alkali metal oxides and at least one oxide selected from alkaline earth metal oxides and zinc oxide;
  (ii) lead oxide glasses having the following mole percent composition: 1.2% to 3.5% of $B_2O_3$, 50% to 58% of $P_2O_5$, 10% to 30% of PbO and 0% to 5% of at least one oxide selected from the oxide of Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, Th, and U, which glass includes at least one oxide selected from alkali metal oxides and at least one oxide selected from alkaline earth metal oxides and zinc oxide;
  (iii) bismuth oxide glasses having the following mole percent composition: 1.2% to 20% of $B_2O_3$, 50% to 75% of $Bi_2O_3$, 10% to 30% of ZnO, and 0% to 5% of at least one oxide selected from the oxide of Pb, Fe, Si, Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, Th, and U, which glass includes at least one oxide selected from alkali metal oxides and at least one oxide selected from alkaline earth metal oxides;
  (iv) borate oxide glasses having the following mole percent composition: 15% to 35% CaO, 35% to 55% $B_2O_3$, 10% to 35% $SiO_2$, 0% to 20% of at least one oxide selected from the oxide of: Mg, Sr, Ba, Li, P, Na, K, Zr, Mo, W, Nb, and 0% to 8% of F.

The glass frit is preferably present in the ceramifiable material in an amount of from 2 to 70% by weight, more preferably from 5 to 40% by weight, with respect to the total weight of the material.

The inert inorganic filler is preferably selected from: silicates such as, for example, aluminum silicates (for example, optionally calcined clays, e.g. kaolin, smectite, illite, mullite), magnesium silicates (for example, optionally calcined talc); hydroxides, hydrate oxides, salts or hydrated salt of metals, in particular of calcium, aluminum or magnesium such as, for example, magnesium hydroxide, aluminum hydroxide, alumina trihydrate, magnesium carbonate hydrate, magnesium carbonate, magnesium calcium carbonate hydrate, calcium carbonate, magnesium calcium carbonate; or mixtures thereof.

The inert inorganic filler may be advantageously used in the form of coated particles. Coating materials preferably used are saturated or unsaturated fatty acids containing from 8 to 24 carbon atoms and metal salts thereof such as, for example, oleic acid, palmitic acid, stearic acid, isostearic acid, lauric acid, magnesium or zinc stearate or oleate, or mixtures thereof.

To improve compatibility between the inert inorganic filler and the polymeric material, at least one coupling agent may be added to the composition. Said coupling agent may be selected e.g. from saturated silane compounds or silane compounds containing at least one ethylene unsaturation; epoxides containing at least one ethylene unsaturation; organic titanates; mono- or dicarboxylic acids containing at least one ethylene unsaturation, or derivatives thereof such as, for example, anhydrides or esters.

The inert inorganic filler is preferably present in the ceramifiable material in an amount of from 20 to 80% by weight, more preferably from 40 to 70% by weight, with respect to the total weight of the material.

According to a preferred embodiment, the inert inorganic filler may be at least partially in the form of nanoparticles, having preferably an average particle size (at least in one dimension) equal to or lower than 2000 nm, more preferably from 1 to 500 nm. The Applicant has found that the presence of inert inorganic filler nanoparticles in the ceramifiable layer increases mechanical resistance of the resulting ceramic material, thus improving the cable performance in case of fire. Preferably, the amount of inert inorganic filler nanoparticles is not higher than 20% by weight, with respect to the total weight of the ceramifiable material. In fact, higher amounts of nanoparticles may excessively increase viscosity of the ceramifiable composition, and therefore may jeopardize processability.

The tubular layer according to the present invention generally may have a thickness of from 0.5 to 2.0 mm, more preferably from 0.8 to 1.2 mm.

As to the flame shielding layer, it has mainly the function of avoiding direct contact of the underlying tubular layer(s) with the flames which surround the cable in case of fire. Therefore, the flame shielding layer should be formed by a material which is able to withstand high temperatures and direct exposure to flames without being burnt or anyway destroyed for a sufficient time to allow an underlaying layer of a ceramifiable material to complete its ceramization.

According to a first preferred embodiment, the flame shielding layer may comprise glass or mica fibers, assembled to form yarns, tapes or sheets, which can be wrapped around the cable so as to form a continuous layer. Particularly preferred are mica tapes, glass yarns or combinations thereof.

According to a second preferred embodiment, the flame shielding layer may comprise a metal tape, particularly a steel or copper tape, which is longitudinally or helically wrapped around the cable to form a continuous layer. Preferably, the metal tape is coated on both sides with a thin polymer layer, usually an ethylene copolymer. Preferably, the metal tape is corrugated, so as to improve flexibility.

As reported hereinabove, the fire resistant optical cable according to the present invention may further comprise at least one flame retardant sheath. Said at least one flame retardant sheath may be positioned as the outermost cable layer (i.e. as outer jacket).

In a preferred embodiment, the fire resistant optical cable according to the present invention may comprise at least two flame retardant sheaths, the first one in the outermost position (so as to perform the function of cable outer sheath) and the second one in an inner position with respect to the flame shielding layer. In this arrangement, the flame shielding layer is sandwiched between the two flame retardant sheaths.

The flame retardant sheath(s) may be formed by a composition which comprises at least one polymeric material and at least one flame retardant filler. The polymeric material may be selected from: polyolefins, e.g. polyethylene, polypropylene, copolymers of ethylene with alpha-olefins; copolymers of ethylene with ethylenically unsaturated esters; polyesters; and the like, or mixtures thereof. The flame retardant filler may be selected from: hydroxides, hydrated oxides or hydrated salts of metals, in particular of aluminum or magnesium, such as magnesium hydroxide or alumina trihydrate, er mixtures thereof.

As reported hereinabove, in a preferred embodiment, the plurality of optical fibers are arranged in micromodules. Optical fiber micromodules may have a structure according to the known technique. Usually they comprise a plurality of optical fibers surrounded by at least one retaining element. The optical fibers may be arranged individually or in groups up to 24, preferably up to 12. The retaining element is generally made from a polymeric material, e.g. polyethylene, ethylene-propylene copolymers, ethylene-vinylacetate copolymers or mixtures thereof. The polymeric material usually contains a pigment or dye to impart a specific colour useful for identification purposes. The retaining element may have an inner diameter which is slightly larger (typically of less than 0.2 mm, more preferably from 0.05 mm to 0.15 mm) than the overall outer diameter of the plurality of optical fibers housed therein (so as to form a so called "semi-tight" or "near tight" configuration). Preferably, each micromodule includes optical fibers in a number of from 1 to 24, more preferably from 1 to 12. Therefore, the micromodules are characterized by a minimum amount of covering material in addition to the optical fibers, and this characteristic is advantageous for maintaining transmission capability of the optical fibers in case of fire, since the lower is the amount of covering material, the lower is the risk of signal attenuation due to mechanical stresses exerted on the optical fibers consequently to modifications of the covering material caused by fire.

Depending on the application, the optical fiber micromodules can be surrounded by at least one separation tape which is placed inwardly with respect to the tubular layer. The separation tape may be useful to protect the micromodules during extrusion of the tubular layer. Moreover, especially in case of outdoor installations, the separation tape may be used to hinder water longitudinal penetration. In the latter case, the separation tape is preferably made from a polyester material associated with a water swellable powder.

For some applications, the optical fiber micromodules may include a water-blocking filler, which may be in the form of a grease-like composition or of a water-swellable powder composition (see e.g. patent applications WO 00/58768 and WO 2005/022230).

The fire resistant optical cable according to the present invention may also include additional elements such as:

longitudinal strength members which provide resistance to longitudinal mechanical stresses;

water swellable tapes which prevent water and/or humidity from penetrating into the cable core;

metallic armouring to improve resistance to transversal mechanical stresses and to protect against biological attacks (e.g. rodents);

dielectric armouring to increase cable mechanical performance according to the specific application;

think glass tapes for all dielectric rodent proof cable design;

all dielectric armouring made by glass composite flat or round elements;

metallic wire armouring.

BRIEF DESCRIPTION OF THE DRAWING

Further characteristics will be apparent from the detailed description given hereinafter with reference to the accompanying drawing, in which.

DETAILED DESCRIPTION OF THE PREFERRED EMBODIMENTS

Figure 1:
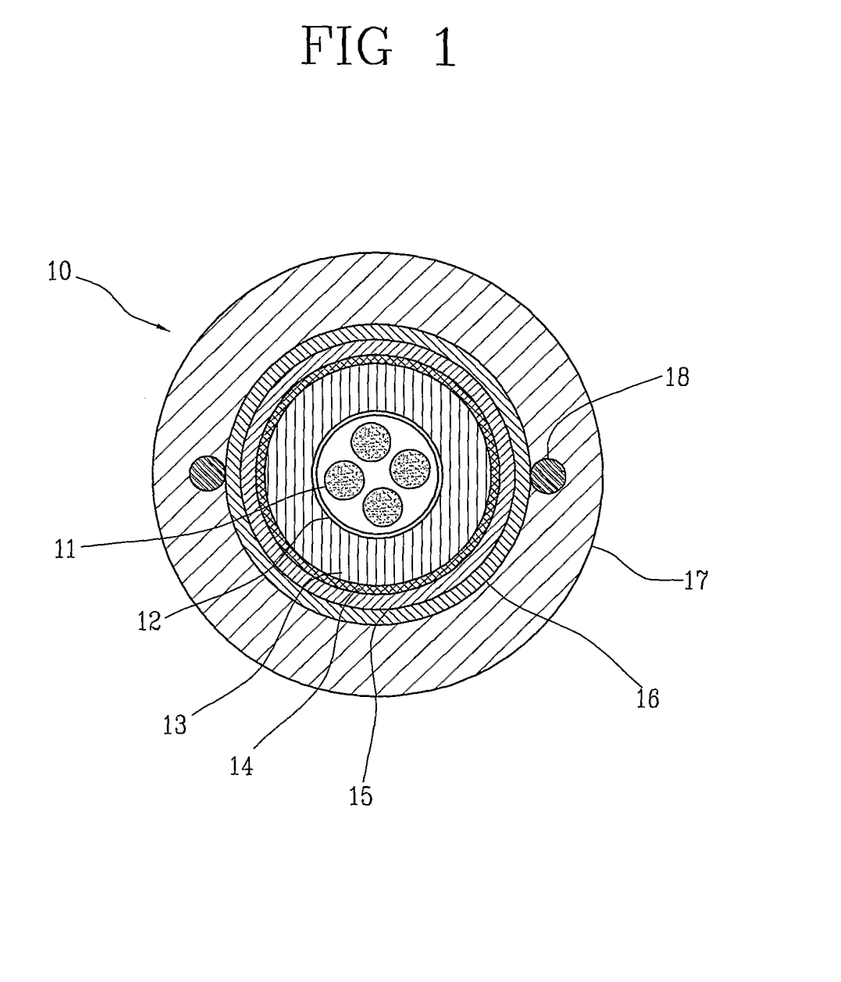
FIG. 1 is a cross section view of a fire resistant optical cable according to a first embodiment of the present invention.

With reference to FIG. 1, the fire resistant optical cable (10) according to a first embodiment of the present invention comprises, from the interior to the exterior, a plurality of optical fiber units (11), preferably in the form of micromodules comprising a plurality of optical fibers (not shown in the figure), arranged individually or in bundles, and surrounded by a retaining element (or buffer tube) (not shown in the figure). The plurality of optical fiber units (11) are surrounded by a separation tape (12) as described hereinabove. The space among the optical fiber units (11) and delimited by the separation tape (12) may be optionally filled with a water blocking filler.

Around the separation tape (12), a tubular layer (13) made from a ceramifiable material is placed. The tubular layer (13) may be optionally surrounded by an all dielectric armour (14), which may be made from, e.g., high strength fibers, such as aramid and/or glass fibers.

As shown in FIG. 1, the cable may optionally comprise a water swellable tape (15) wrapped around the all dielectric armour (14), which is able to block any possible water entering the cable.

According to the present invention, the cable (10) further comprises a flame shielding layer (16) which, in the first embodiment shown in FIG. 1, may be made from a corrugated, longitudinally sealed steel or copper tape coated by a thermoplastic layer.

Finally, the cable (10) according to FIG. 1 is covered by an outer jacket (17) made from a thermoplastic material (e.g. polyethylene) or preferably by a flame retardant thermoplastic composition. The outer jacket (17) may be provided by a pair of longitudinal strength members (18), usually made from glass reinforced plastic.

Figure 2:
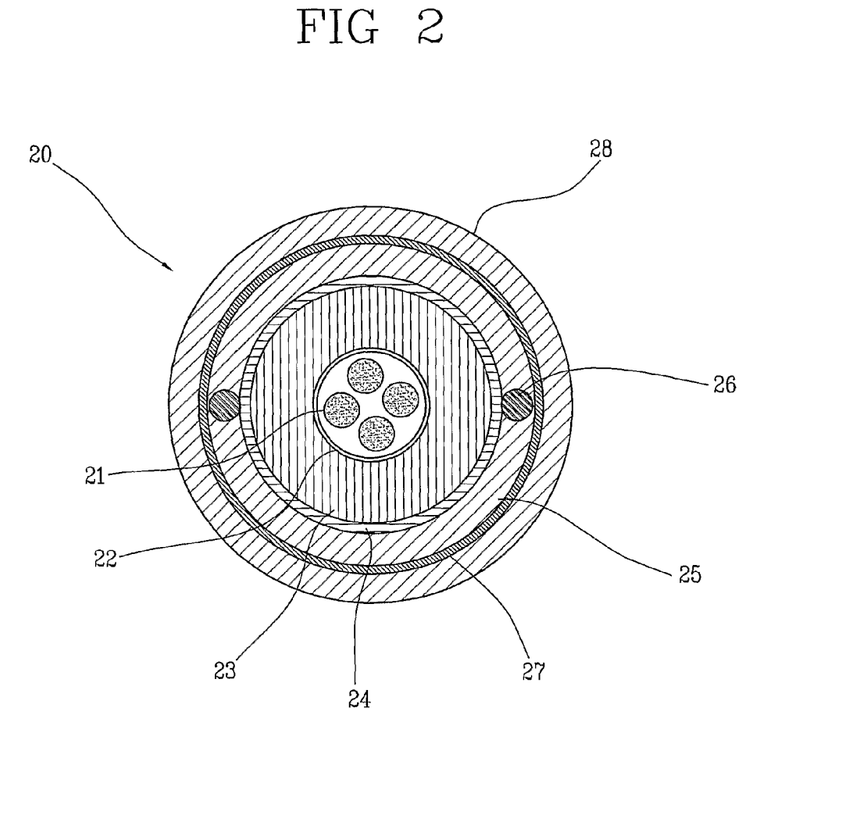
FIG. 2 is a cross section view of a fire resistant optical cable according to a second embodiment of the present invention.

FIG. 2 shows a second embodiment of the fire resistant optical cable (20) according to the present invention which comprises, from the interior to the exterior, a plurality of optical fiber units (21) surrounded by a separation tape (22) as described hereinabove. Around the separation tape (22), a tubular layer (23) made from a ceramifiable material is placed. The tubular layer (23) may be optionally surrounded by a water swellable tape (24).

The cable (20) of FIG. 2 further comprises a first flame retardant sheath (25) (inner jacket), optionally provided with a pair of longitudinal strength members (26), and a second flame retardant sheath (28) (outer jacket), A flame shielding layer (27) is interposed between the first (25) and the second (28) flame retardant sheath. In the second embodiment shown in FIG. 2, the flame shielding layer (27) may be made from mica tapes wrapped around the cable core.

Figure 3:
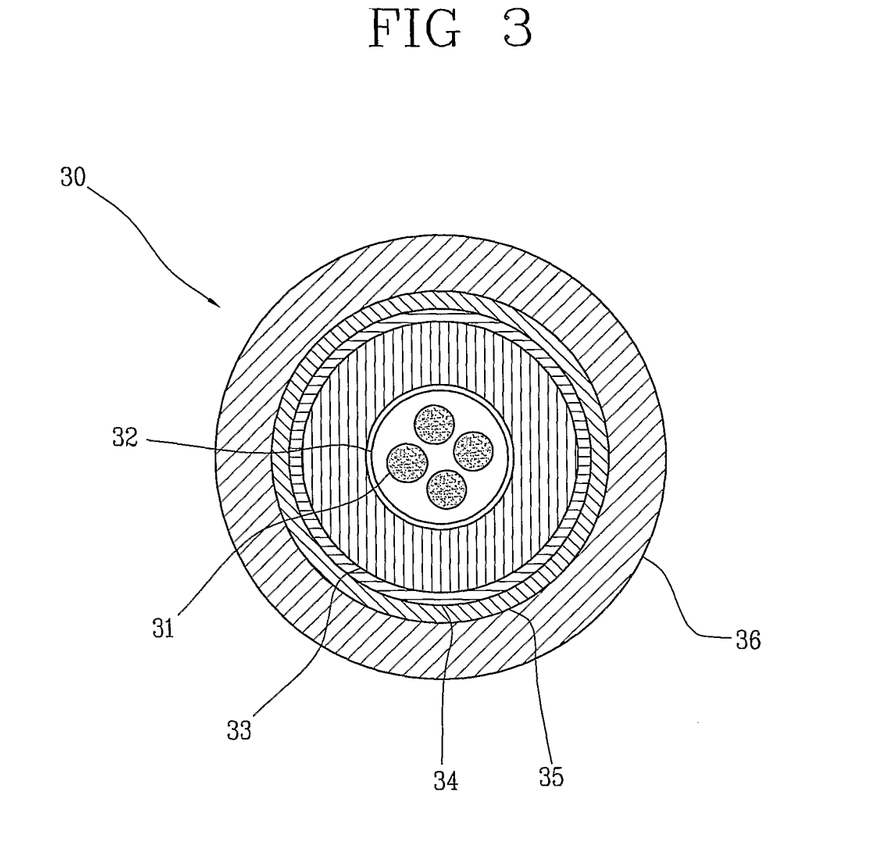
FIG. 3 is a cross section view of a fire resistant optical cable according to a third embodiment of the present invention.

FIG. 3 shows a third embodiment of the fire resistant optical cable (30) according to the present invention which comprises, from the interior to the exterior, a plurality of optical fiber its (31) surrounded by a separation tape (32) as described hereinabove. Around the separation tape (22), a tubular layer (33) made from a ceramifiable material is placed.

According to the third embodiment shown in FIG. 3, the tubular layer (33) is surrounded by two flame shielding layers, the first flame shielding layer (34) being made from mica tapes, while the second flame shielding layer (35) is made from glass yarns. In alternative embodiments, in order to reduce the diameter of the cable (30), only one of the two shielding layers (34, 35) may be present. The cable (30) of FIG. 3 further comprises a flame retardant sheath (36) (outer jacket).

The above figures show only some embodiments of a cable according to the invention. Suitable modifications can be made to these embodiments according to specific technical needs and application requirements without departing from, the scope of the invention.

The following examples are provided to further illustrate the invention.

Example 1

In a tubular element made from polyethylene, 12 optical fiber micro/nodules were housed. Each micromodule was constituted by 12 optical fibers inserted into a buffer tube of flame retardant polyethylene (Casico FR4805), having an internal nominal diameter of 1.1 mm and an external nominal diameter of 1.4 mm. The buffer tube was filled with a water blocking filler based on silicone gel.

The tubular element was surrounded by an armour made from a corrugated steel tape longitudinally wrapped and thermally sealed along the overlapping, and then by an outer jacket made from polyethylene, provided with two longitudinal strength members embedded into the outer jacket itself.

The above optical cable specimen was subject to a test of fire resistance according to international standard IEC 60331-25 (1999, 1st Edition). A cable sample was positioned horizontally by means of two supports and a burner was placed under the sample at a distance of about 75 mm. Propane gas fed the burner in order to obtain a flame with a temperature between 850 and 900° C. During the test signal attenuation at 1550 nm wavelength was measured over time by means of a power source and an optical power meter. A suitable number of fibers was looped in order to achieve a better accuracy during the attenuation variation recording. The so obtained curve of loss change (dB) v. time (min) is reported in FIG. 4.

Figure 4:
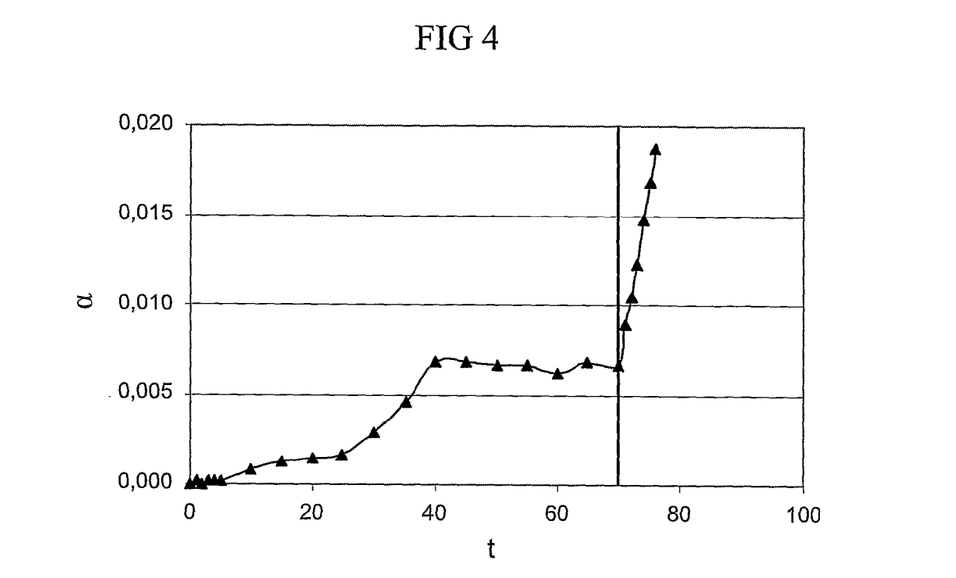
FIG. 4 is a curve of signal attenuation or loss change (α), expressed in dB, at 1550 inn wavelength measured over time (t), expressed in minutes, for a reference cable specimen.

As shown by the above curve, it is apparent that, during application of the flame on the cable, the attenuation increase was quite small, with a slight increase at around 40 minutes. However, after 70 minutes the flame was extinguished and it was observed a pronounced increase in the attenuation value. Six minutes after fire extinguishing, breakage of at least one of the optical fibers was observed.

The above test clearly shows that a flame shielding layer such as a corrugated steel tape is suitable to limit signal attenuation during fire, but gives unsatisfactory results in the stages following the flame extinguishing.

Example 2

A cable specimen was produced according to FIG. 1 (but without the all dielectric armour (14) and the water swellable tape (15)), by using 12 optical fiber micromodules as described in Example 1. The flame shielding layer was constituted by the same corrugated steel tape of Example 1. The tubular layer was made from a ceramifiable material having the following composition:

| Engage ™ 8200 | 23.3 | % by weight |
|---|---|---|
| Vulkanox ™ HS/LG | 0.7 | " |
| Moplen ™ RP 210 G | 5.8 | " |
| Whitetex ™ | 23.3 | " |
| Dynasylan ™ VTMOEO | 0.1 | " |
| Glass frit | 12.7 | " |
| Nanofxl ™ 5 | 5.8 | " |
| Mistroborid ™ R10 C | 29.2 | " |

Engage ™ 8200: ethylenel/1-oetene copolymer (Dow);
Vulkanox ™ HS/LG: 2,2,4-tritnethyl-1,2-dihydroquinoline, polymerized (TMQ antioxidant) (Lanxess);
Moplen ™ RP 210 G: propylene homopolymer (Lyondell Basell);
Whitetex ™: calcined clay (Engelhard);
Dynasylan ™ VTMOEO: vinyltris(2-methoxyethoxy)silane (Degussa);
Nanofil ™ 5: functionalized lamellar nanofiller (Rockwood);
Mistrobond ™ R10 C: talc (Luzenac).

The final cable had the following characteristics:

| Ceramifiable tubular layer: | 6.4/8.4 mm (inner/outer diameters) |
|---|---|
| Corrugated steel tape: | width 42 mm |
| Diameter over steel tube: | 11.8 mm |
| Strength members: | diameter 1.8 mm |
| Outer jacket: | diameter 16 mm |

The above optical cable specimen was subject to a test of flame resistance according to international standard IE 60331-25 (1999, 1st Edition) as described above in Example 1. The so obtained curve of loss change (dB) v. time (min) is reported in FIG. 5.

Figure 5:
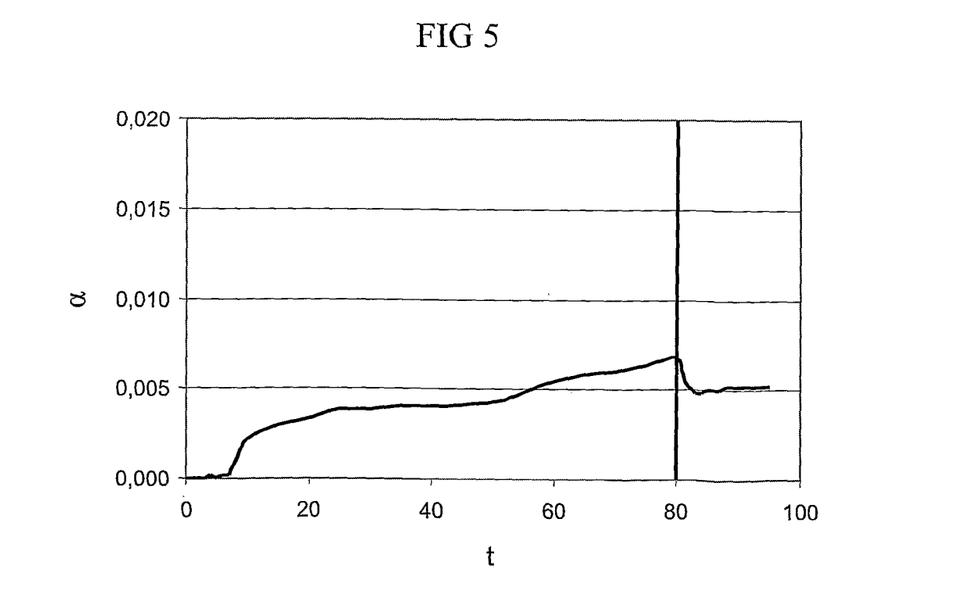
FIG. 5 is a curve of signal attenuation or loss change (α), expressed in dB, at 1550 nm wavelength measured over time (t), expressed in minutes, for a cable specimen according to the invention.

As results from the above curve, the attenuation increase during fire was very low (lower than 0.02 dB), and, differently from Example 1, that value was maintained also after fire extinguishing. No breakage of any optical fiber was observed.

Example 3

A cable specimen was produced according to Example 2, but without the corrugated steel tape. During the flame resistance test the ceramifiable layer burned and the optical fibers broke.

The invention claimed is:

1. A fire resistant optical cable comprising:
   a plurality of optical fibers, wherein the plurality of optical fibers is arranged in micromodules;
   at least one tubular layer of a ceramifiable material surrounding the plurality of optical fibers; and
   at least one flame shielding layer surrounding the tubular layer,
   wherein the ceramifiable material comprises:
   at least one polymeric material;
   at least one glass frit; and
   at least one inert inorganic filler.

2. The fire resistant optical cable according to claim 1, wherein the polymeric material is selected from: polyolefins comprising homopolymers and copolymers; copolymers of ethylene with at least one ethylenically unsaturated ester; polyesters; polyethers; polyether/polyester copolymers; silicones; and mixtures thereof.

3. The fire resistant optical cable according to claim 1, comprising from 10 to 60% by weight, with respect to the total weight of the material, of polymeric material in the ceramifiable material.

4. The fire resistant optical cable according to claim 1, comprising from 2 to 70% by weight, with respect to the total weight of the material, of glass frit in the ceramifiable material.

5. The fire resistant optical cable according to claim 1, wherein the inert inorganic filler is selected from: silicates; hydroxides; hydrate oxides; salts or hydrated salt of metals; or mixtures thereof.

6. The fire resistant optical cable according to claim 1, comprising from 20 to 80% by weight, with respect to the total weight of the material, of inert inorganic filler in the ceramifiable material.

7. The fire resistant optical cable according to claim 1, wherein the inert inorganic filler is at least partially in the form of nanoparticles.

8. The fire resistant optical cable according to claim 7, wherein the inert inorganic filler nanoparticles are present in an amount not higher than 20% by weight, with respect to the total weight of the ceramifiable material.

9. The fire resistant optical cable according to claim 1, wherein the tubular layer has a thickness of 0.5 to 2.0 mm.

10. The fire resistant optical cable according to claim 1, wherein the flame shielding layer comprises glass or mica fibers, assembled to form yarn, tapes or sheets.

11. The fire resistant optical cable according to claim 1, wherein the flame shielding layer comprises a metal tape longitudinally or helically wrapped around the cable to form a continuous layer.

12. The fire resistant optical cable according to claim 1, further comprising at least one flame retardant sheath.

13. The fire resistant optical cable according to claim 12, comprising at least two flame retardant sheaths, the first one in the outermost position of the cable, and the second one in an inner position with respect to the flame shielding layer.

* * * * *